United States Patent
Li

(10) Patent No.: US 9,295,356 B2
(45) Date of Patent: Mar. 29, 2016

(54) AUTOMATIC TEA MAKER

(75) Inventor: Zhihang Li, Zhaoqing (CN)

(73) Assignee: Zhaoqing Finehere Electric, Ltd., Zhaoqing, Guangdong (CN)

( * ) Notice: Subject to any disclaimer, the term of this patent is extended or adjusted under 35 U.S.C. 154(b) by 790 days.

(21) Appl. No.: 13/576,817

(22) PCT Filed: May 27, 2010

(86) PCT No.: PCT/CN2010/073301
§ 371 (c)(1),
(2), (4) Date: Aug. 2, 2012

(87) PCT Pub. No.: WO2011/094978
PCT Pub. Date: Aug. 11, 2011

(65) Prior Publication Data
US 2012/0304868 A1 Dec. 6, 2012

(30) Foreign Application Priority Data
Feb. 5, 2010 (CN) ............ 2010 2 0112954 U

(51) Int. Cl.
*A47J 31/00* (2006.01)
*A47J 31/18* (2006.01)
*A47J 31/40* (2006.01)

(52) U.S. Cl.
CPC .............. *A47J 31/18* (2013.01); *A47J 31/401* (2013.01)

(58) Field of Classification Search
CPC ..... A47J 31/057; A47J 31/54; A47J 31/3614; A47J 31/303; A47J 31/02; A47J 31/20; A47J 31/0573; B65D 85/8043; A47G 19/14; A23G 9/045

USPC ........... 99/295, 288, 275, 280, 287, 299, 303, 99/305, 306, 307
See application file for complete search history.

(56) References Cited

U.S. PATENT DOCUMENTS

| | | | | |
|---|---|---|---|---|
| 1,556,026 A | * | 10/1925 | Pouget | 99/315 |
| 1,748,135 A | * | 2/1930 | Kise | 99/306 |
| 2,489,925 A | * | 11/1949 | Omwake | 422/310 |
| 3,354,811 A | * | 11/1967 | King | 99/282 |
| 4,162,751 A | * | 7/1979 | Hetland et al. | 222/293 |
| 4,193,522 A | * | 3/1980 | Edelbach | 222/145.6 |
| 4,688,474 A | * | 8/1987 | Anderl | 99/289 R |
| 4,715,315 A | * | 12/1987 | Burford | 118/684 |

(Continued)

FOREIGN PATENT DOCUMENTS

| CN | 2598480 | 1/2004 |
|---|---|---|
| CN | 101224086 | 7/2008 |

(Continued)

OTHER PUBLICATIONS

International Search Report PCT/CN2010/073301.

*Primary Examiner* — David Angwin
*Assistant Examiner* — Jimmy Chou
(74) *Attorney, Agent, or Firm* — James B. Conte; Husch Blackwell LLP

(57) ABSTRACT

An automatic tea maker comprises a water tank (1), a heater (6), a pot for tea-leaf storage (5), a tea-leaf transmitting mechanism and a tea making mechanism. The water tank (1) is connected to the heater (6). The tea making mechanism comprises a tea making room (15) and a tea outlet pipe (16). The pot for tea-leaf storage (5) is connected to the tea making room (15) of the tea making mechanism through the tea-leaf transmitting mechanism.

11 Claims, 2 Drawing Sheets

(56) References Cited

U.S. PATENT DOCUMENTS

| | | | | |
|---|---|---|---|---|
| 4,802,609 | A * | 2/1989 | Morse et al. | 222/158 |
| 4,815,366 | A * | 3/1989 | Hauslein | 99/283 |
| 5,038,675 | A * | 8/1991 | Hartel | 99/286 |
| 5,245,914 | A * | 9/1993 | Vitous | 99/280 |
| 5,281,785 | A * | 1/1994 | Pasbrig | 219/689 |
| 5,738,786 | A | 4/1998 | Winnington-Ingram | |
| 5,975,357 | A * | 11/1999 | Topar | 222/56 |
| 6,085,637 | A * | 7/2000 | Fukushima | 99/279 |
| 6,182,555 | B1 * | 2/2001 | Scheer et al. | 99/290 |
| 6,298,768 | B1 * | 10/2001 | Fukushima | 99/279 |
| 6,324,964 | B1 * | 12/2001 | Niederberger et al. | 99/287 |
| 6,343,542 | B1 * | 2/2002 | Shen | 99/299 |
| 6,612,224 | B2 * | 9/2003 | Mercier et al. | 99/282 |
| 6,722,264 | B2 * | 4/2004 | Takatsuki et al. | 99/288 |
| RE39,431 | E * | 12/2006 | Naden et al. | 222/469 |
| 7,268,698 | B2 * | 9/2007 | Hart et al. | 340/870.07 |
| 8,151,692 | B2 * | 4/2012 | Sala et al. | 99/287 |
| 8,151,693 | B2 * | 4/2012 | Sala et al. | 99/287 |
| 8,327,755 | B1 * | 12/2012 | Michalek et al. | 99/300 |
| 8,640,605 | B2 * | 2/2014 | Hart | 99/306 |
| 2003/0061941 | A1 * | 4/2003 | DeWine | 99/275 |
| 2005/0193890 | A1 * | 9/2005 | Fukushima et al. | 99/275 |
| 2006/0005713 | A1 * | 1/2006 | Soryas | 99/275 |
| 2008/0168905 | A1 * | 7/2008 | Hart | 99/280 |
| 2008/0250936 | A1 * | 10/2008 | Cortese | 99/295 |
| 2009/0101019 | A1 * | 4/2009 | Coccia | 99/280 |
| 2010/0024665 | A1 * | 2/2010 | Roysner et al. | 99/452 |
| 2010/0107885 | A1 * | 5/2010 | Kirschner et al. | 99/279 |
| 2010/0128556 | A1 * | 5/2010 | Shultis | 366/138 |

FOREIGN PATENT DOCUMENTS

| | | |
|---|---|---|
| CN | 101254067 | 9/2008 |
| CN | 201370471 | 12/2009 |
| CN | 201431338 | 3/2010 |
| DE | 29608390 | 8/1996 |
| GB | 2 301 021 A | 11/1996 |

* cited by examiner

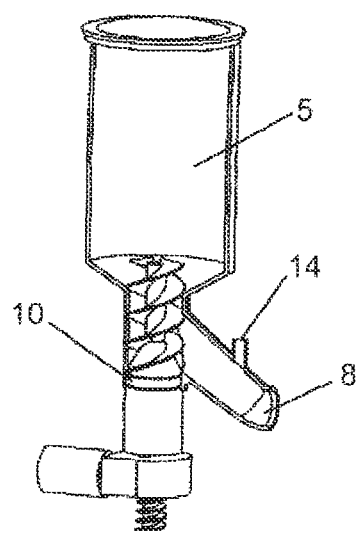
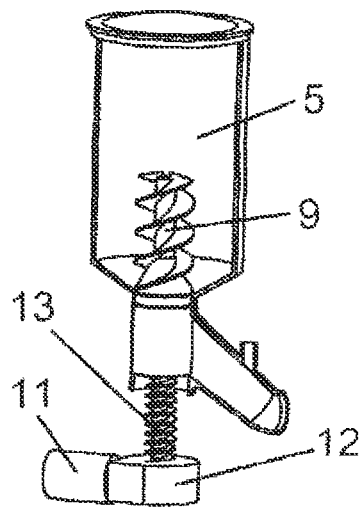
FIG 3          FIG 4
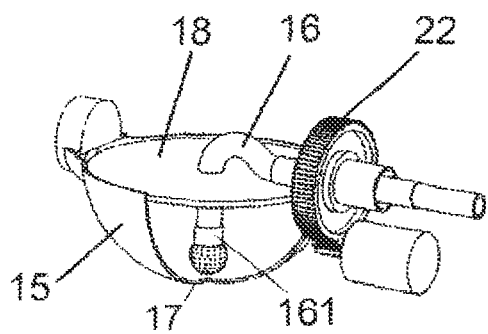
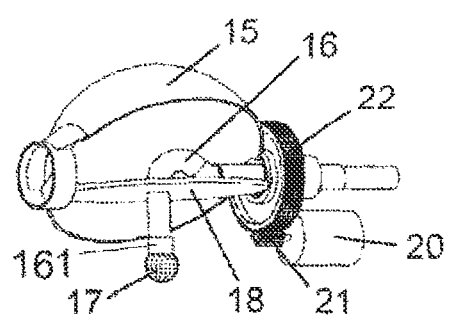
FIG 5          FIG 6
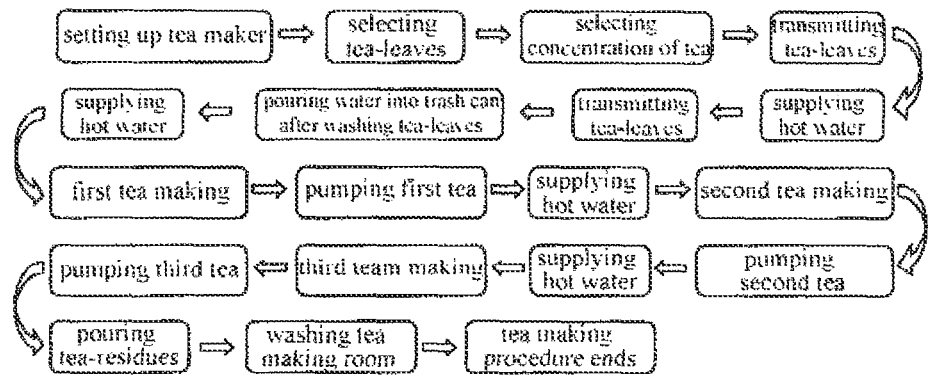
FIG 7

AUTOMATIC TEA MAKER

TECHNICAL FIELD

The application relates to a technical field of drink preparation, in particular, to a tea maker for making tea automatically.

BACKGROUND

Currently, a conventional tea maker is able to control water temperature, water amount and tea making time automatically, but unable to obtain tea-leaves automatically. Without means for storing and transmitting tea-leaves in the tea maker, tea-leaves are stored in an ordinary container separately. However, tea-leaves tend to go bad due to moistures and strong smells. The conventional tea maker is unable to provide a good environment for tea-leaves storage to ensure the quality of tea-leaves. Moreover, with the conventional tea maker into which tea-leaves are added manually, it is inconvenient to obtain the tea-leaves and also hard to control the amount of tea-leaves. In view of the above, the conventional tea maker cannot make tea automatically and thus is hard to guarantee the effect of making tea.

In addition, the conventional tea maker, after making tea, still needs to clear tea-residues away manually. In fact, the process of tea making is not performed automatically and successively.

SUMMARY

Aimed to solve the technical problems, the present application provides an automatic tea maker comprising a water tank, a heater, a pot for tea-leaf storage, a tea-leaf transmitting mechanism, and a tea making mechanism, wherein the water tank is connected to the heater, the tea making mechanism comprises a tea making room and a tea outlet pipe, and the pot for tea-leaf storage is connected to the tea making room of the tea making mechanism via the tea-leaf transmitting mechanism. In order to store and take various tea-leaves, the automatic tea maker comprises one or more pots for tea-leaf storage, tea-leaf transmitting mechanisms and tea making mechanisms, which are corresponding to one another.

The present invention further comprises a storage room and a refrigerating means, wherein the pot for tea-leaf storage is provided within the storage room, and the refrigerating means controls the temperature within the storage room. In the present invention, the storage room remains at a low temperature using the technical of refrigeration so as to provide a good storage condition to guarantee the quality of tea-leaves.

In an embodiment, the tea-leaf transmitting mechanism comprises a funnel for tea-leaf transmission, a worm and a worm driving means, wherein the funnel for tea-leaf transmission is connected between a bottom outlet of the pot for tea-leaf storage and the tea making room of the tea making mechanism, the worm is located within and at the bottom of the pot for tea-leaf storage, and within an upper section of the funnel for tea-leaf transmission, and the worm driving means is connected to and controls the worm to move up and down within its location space. When the worm moves upwards to the bottom outlet in the pot for tea-leaf storage, the bottom end of the worm seals the bottom outlet of the pot for tea-leaf storage so as to prohibit the transmission of tea-leaves. At this time, tea-leaves are stored in the pot for tea-leaf storage. When the worm moves downwards so as to open the bottom outlet of the pot for tea-leaf storage, tea-leaves drop into the funnel for tea-leaf transmission, and then drop into the tea making room. In the present embodiment, not only tea-leaves are obtained automatically, but also the amount of tea-leaves required can be controlled automatically by the movement of the worm. Thus various requirements are met and an optimum effect of tea making is achieved.

In order to enhance the seal, a sealing ring is provided around a bottom edge of the worm, and mated with an inner diameter of the bottom outlet of the pot for tea-leaf transmission and an inner diameter of the upper section of the funnel for tea-leaf transmission. In addition, a hot water inlet connected with the heater is provided at the lower section of the funnel for tea-leaf transmission. Water in the water tank flows into the tea making room through the lower section of the funnel for tea-leaf transmission after being heated by the heater.

In the above embodiment, the worm driving means is composed of a motor, a driver and a screw rod, wherein the screw rod is connected with the worm, and the motor is connected to and drives the screw rod via the driver.

In another embodiment, the present invention further comprises a tea-residue clearing mechanism, wherein the tea-residue clearing mechanism comprises a rotation driving means and a trash can, the tea making room of the tea making mechanism has an open top, the rotation driving mechanism is connected to and drives the tea making room to rotate around its lateral axis, the trash can is provided below the tea making room. If the tea-residues are needed to be poured out, the rotation driving means drives the tea making room to rotate 180 degree, such that the tea making room has its open top overturned and then the tea-residues are poured into the trash can without needing cleaning manually.

Further, the tea-residue clearing mechanism further comprises a top cover, wherein the top cover is provided on the top of the tea making room so as to scrape away the tea-residues in the tea making room, and has a longitudinal dimension being twice of the depth of the tea making room. During clearing the tea-residue, the top cover remains at its position and the tea making room is turned over. Then, the top cover scrapes the tea-residue away into the trash can so as to clear the tea-residue away completely.

In the above embodiment, the tea making room of the tea making mechanism has various shapes. The top cover can scrape the tea-residue away from the tea making room into the trash can only if the longitudinal dimension of the top cover is twice of the depth of the tea making room. Preferably, the tea making room of the tea making mechanism is a hemisphere shape, and the top cover is disc-shaped and mated with the open top of the tea making room.

In the above embodiment, the tea outlet pipe of the tea making mechanism has a water inlet located in the center of the tea making room. A filter is provided at the water inlet of the tea outlet pipe so as to insulate the tea-residues. The rotation of the tea making room is achieved as follows. The rotation driving means is composed of a motor, a driving gear and a transmission gear, wherein the driving gear is provided at an output shaft of the motor, the transmission gear engages with the driving gear, and the tea making room has sides secured to gear faces of the transmission gear.

BRIEF DESCRIPTION OF THE DRAWINGS

Hereafter, the invention will be described in detail in conjunction with the embodiments and the accompanying drawings, in which:

FIG. 3 is a structure schematic diagram showing a tea-leaf transmitting mechanism of the example of FIG. 1, showing a state in which the tea-leaf transmitting mechanism transmits tea-leaves;

FIG. 4 is a structure schematic diagram showing the tea-leaf transmitting mechanism of the example of FIG. 1, showing a state in which the tea-leaf transmitting mechanism stores tea-leaves;

FIG. 5 is a structure schematic diagram of the example of FIG. 1, showing a state of making tea;

FIG. 6 is a structure schematic diagram of the example of FIG. 1, showing a state of clearing tea-residues away;

FIG. 7 is a schematic diagram showing an operation process of the example of FIG. 1.

In Figures:

1 . . . water tank, 2 . . . storage room, 3 . . . cover plate, 4 . . . electronic refrigerating board, 5 . . . spot for tea-leaf storage, 6 . . . heater, 7 . . . sealing sleeve, 8 . . . funnel for tea-leaf transmission, 9 . . . worm, 10 . . . sealing ring, 11, 20 . . . motor, 12 . . . driver, 13 . . . screw rod, 14 . . . hot water inlet, 15 . . . tea making room, 16 . . . tea outlet pipe, 17 . . . filter, 18 . . . top cover, 19 . . . trash can, 21 . . . driving gear, 22 . . . transmission gear, 161 water inlet.

DETAILED DESCRIPTION

FIGS. 1 to 7 are schematic views showing an embodiment of an automatic tea maker according to the invention.

Figure 1:
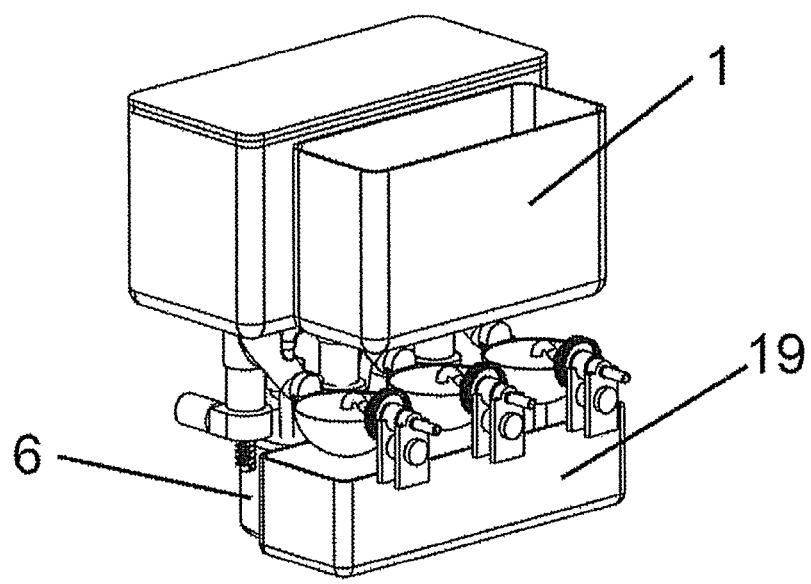
FIG. 1 is a structure schematic diagram of an example of the invention.

As shown in FIG. 1, in an embodiment of the automatic tea maker according to the invention, a tea maker comprises a water tank 1, a heater 6, a storage room 2, a spot for tea-leaf storage 5, a refrigerating means, tea-leaf transmitting mechanisms, a tea making mechanisms and a tea-residue clearing mechanism. The water tank 1 is connected to the heater 6.

Figure 2:
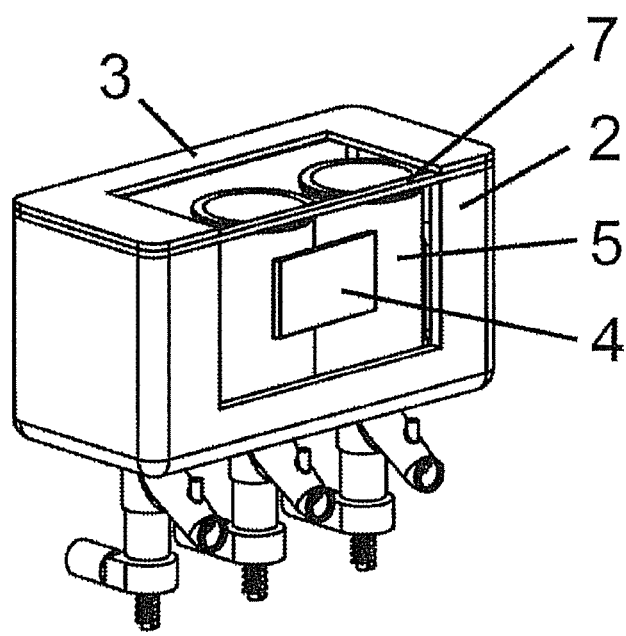
FIG. 2 is a structure schematic diagram showing an storage room of the example of FIG. 1.

As shown in FIG. 2, a cover plate 3 is provided on the top of the storage room 2 so as to open and close the storage room 2. A sealing sleeve 7 of silicon rubber is provided between the cover plate 3 and the storage room 2 to seal the storage room 2. Several individual spots for tea-leaf storage 5 are provided within the storage room 2 so as to store various tea-leaves, respectively. The refrigerating means is an electronic refrigerating board 4 which is provided within the storage room 2 so that the storage room 2 remains at a low temperature.

As shown in FIGS. 3 and 4, the tea-leaf transmitting mechanism comprises a funnel for tea-leaf transmission 8, a worm 9 and a worm driving means. The funnel for tea-leaf transmission 8 is connected between a bottom outlet of the pot for tea-leaf storage 5 and the tea making mechanism. The worm 9 can be located inside and at the bottom of the spot for tea-leaf storage 5 and can be located in an upper section of the funnel for tea-leaf transmission 8. The worm 9 is provided with a sealing ring 10 around its bottom edge, and the sealing ring 10 is mated with inner diameters of the bottom outlet of the spot for tea-leaf storage 5 and of the upper section of the funnel for tea-leaf transmission 8. The worm driving means is comprised of a motor 11, a driver 12, and a screw rod 13 connected with the worm 9, wherein the motor 11 is connected to and drives the screw rod 13 via the driver 12. The motor 11 is set up and then drives the screw rod 13 via the driver 12. In turn, the screw rod 13 brings the worm 9 to move up and down inside the bottom of the spot for tea-leaf storage 5 and the upper section of the funnel for tea-leaf transmission 8.

A hot water inlet 14 connected with the heater 6 is provided at a lower section of the funnel for tea-leaf transmission 8. After heated by the heater 6, water in the water tank 1 flows through the hot water inlet 14 and enters into the tea making mechanism via the funnel for tea-leaf transmission 8.

Back to FIGS. 1 and 2, the number of the tea-leaf transmitting mechanisms and the number of the tea making mechanisms correspond to the number of the spot for tea-leaf storage 5, respectively. As shown in FIGS. 5 and 6, the tea making mechanism comprises a tea making room 15 and a tea outlet pipe 16. The funnel for tea-leaf transmission 8 is connected between the bottom outlet of the spot for tea-leaf storage 5 and the tea making room 15 of the tea making mechanism (as seen from FIG. 1). The tea making room 15 is a hemisphere shape with an open top. The tea outlet pipe 16 has a water inlet 161 located at the center of the tea making room 15. In addition, a filter 17 is provided at this water inlet 161.

The tea outlet pipe 16 is connected to a water outlet mechanism (not shown). The water outlet mechanism may be composed of a main pipe, a branch pipe, a pump, and an electromagnetic valve, wherein the main pipe and the branch pipe are connected to a cup and a trash can 19, respectively. Water flowing to the cup and the trash can 19 can be controlled by the electromagnetic valve.

As shown in FIGS. 5 and 6, the tea-residue clearing mechanism comprises a top cover 18, a rotation driving means and the trash can 19. The top cover 18 is disc-shaped, provided on the top of the tea making room 15 and mated with the open top of the tea making room 15. The rotation driving means is comprised of a motor 20, a driving gear 21 and a transmission gear 22. The driving gear 21 is provided on an output shaft of the motor 21. The transmission gear 22 engages with the driving gear 21. The tea making room 15 has sides secured to gear faces of the transmission gear 22.

FIG. 7 is a schematic view showing an operation process of the present example. The tea making procedure can be set and changed according to personal preferences.

For example, the concentration of tea may be strong, middle (default) and weak.

The amount of tea transmission may range from 3 to 8 g every time according to the concentration of tea, such as 8 g for a strong tea, 5 g for a middle tea and 3 g for a weak tea.

Appropriate temperature of hot water may be provided based upon the selected tea-leaves, such as 98° C. for black tea, 85° C. for green tea, and 95° C. for clean tea.

The time of tea making may range from 30 s to 300 s. In default, time for first, second, third and forth tea makings are 60 s, 80 s, 100 s and 120 s, respectively.

The number of times for tea making may range from 3 to 8, and defaults to 4.

The operation procedure of the example is illustrated as below.

After tea-leaves are selected, the motor 11 is set up with a control signal. The motor 11 rotates clockwise so as to enable the driver 12 to operate. The driver 12 then drives the screw rod 13 to rotate clockwise and to move downwards. As shown in FIG. 3, the screw rod 13 in turn brings the worm 9 to rotate clockwise and to move downwards. Tea-leaves then drop into the funnel for tea-leaf transmission 8 due to the rotation of the worm 9, and then drop into the tea making room 15. After the tea-leaves are transmitted, the motor 11 rotates anticlockwise so as to enable the driver 12 to operate in reverse. The driver 12 then drives the screw rod 13 to rotate anticlockwise and to move upwards. The screw rod 13 in turn brings the worm 9 to rotate anticlockwise and to move upwards. As shown in FIG. 4, the sealing ring 10 at the bottom edge of the worm 9 completely seals the bottom outlet of the spot for tea-leaf storage 5.

Hot water flows into the tea making room 15 through the hot water inlet 14 at the lower section of the funnel for tea-leaf transmission 8, as shown in FIG. 5, so as to brew the tea-leaves. Tea then discharges through the tea outlet pipe to the cup under the control of the electromagnetic valve.

After the number of time for tea making is achieved, tea-residues should be cleared away. The motor 20 is set up with a control signal, and then drives the driving gear 21. The driving gear 21 then brings the transmission gear 22 to rotate. As shown in FIG. 6, the transmission gear 22 in turn brings the tea making room 15 to rotate 180 degree. During the rotation of the tea making room 15, the tea-residues are scraped away by the top cover 18 and dropped into the trash can 19. The motor 20 then operates in a reverse direction to drive the driving gear 21. The driving gear 21 then brings the transmission gear 22 to rotate. The transmission gear 22 in turn brings the tea making room 15 to rotate in a reverse direction by 180 degree. Then, the tea making room 15 is cleaned by hot water. Under the control of the electromagnetic valve, a portion of the hot water is pumped to the trash can 19 by a pump, and a portion of the hot water is poured into the trash can 19 as the motor 20 overturns the tea making room 15. To this end, the entire tea making procedure including tea-leaf transmission, tea making and tea-residue clearing is done automatically.

It should be understood that the above embodiment and its description is used to illustrate the invention, not to limit it. Those skilled in the art may understand that, the technical features of the invention can be changed equivalently, which is within the scope of the claims appended hereto.

The invention claimed is:

1. An automatic tea maker, comprising a water tank (1), a heater (6), a pot for tea-leaf storage (5), a tea-leaf transmitting mechanism, and a tea making mechanism,
    wherein the water tank (1) is connected to the heater (6),
    wherein the tea making mechanism comprises a tea making room (15) and a tea outlet pipe (16), and
    wherein the pot for tea-leaf storage (5) is connected to the tea making room (15) of the tea making mechanism via the tea-leaf transmitting mechanism,
    wherein the automatic tea maker further comprises a tea-residue clearing mechanism,
    wherein the tea-residue clearing mechanism comprises a rotation driving means and a trash can (19),
    wherein the tea making room (15) of the tea making mechanism has an open top,
    wherein the rotation driving means is connected to the tea making room (15) and is configured to drive the tea making room (15) to rotate around a lateral axis of the tea making room (15), and
    wherein the trash can (19) is provided below the tea making room (15),
    wherein the tea-residue clearing mechanism further comprises a top cover (18),
    wherein the top cover (18) is provided on the top of the tea making room (15), and has a longitudinal dimension being twice of the depth of the tea making room (15) wherein during rotation of the tea making room (15), tea-residues in the tea making room (15) are scraped away by the top cover (18) and dropped into the trash can (19).

2. The automatic tea maker as claimed in claim 1, comprising one or more pots for tea-leaf storage (5), one or more tea-leaf transmitting mechanisms and one or more tea making mechanisms, which are corresponding to one another.

3. The automatic tea maker as claimed in claim 1 or 2, further comprising a storage room (2) and a refrigerating means,
    wherein the pot for tea-leaf storage (5) is provided within the storage room (2), and
    wherein the refrigerating means is configured to control the temperature within the storage room (2).

4. The automatic tea maker as claimed in claim 1, wherein the tea-leaf transmitting mechanism comprises a funnel for tea-leaf transmission (8), a worm (9) and a worm driving means,
    wherein the funnel for tea-leaf transmission (8) is connected between a bottom outlet of the pot for tea-leaf storage (5) and the tea making room (15) of the tea making mechanism,
    wherein the worm (9) is located within and at the bottom of the pot for tea-leaf storage (5) and within an upper section of the funnel for tea-leaf transmission (8), and
    wherein the worm driving means is connected to the worm (9) and is configured to drive the worm (9) to move up and down within space in which the worm (9) is located.

5. The automatic tea maker as claimed in claim 4, wherein a sealing ring (10) is provided around a bottom edge of the worm (9), and the sealing ring (10) is adapted to be mated with both an inner diameter of the bottom outlet of the pot for tea-leaf transmission (5) and an inner diameter of the upper section of the funnel for tea-leaf transmission (8).

6. The automatic tea maker as claimed in claim 4, wherein a hot water inlet (14) connected with the heater (16) is provided at a lower section of the funnel for tea-leaf transmission (8).

7. The automatic tea maker as claimed in claim 4, wherein the worm driving means is composed of a motor (11), a driver (12) and a screw rod (13),
    wherein the screw rod (13) is connected with the worm (9), and
    via the driver (12).

8. The automatic tea maker as claimed in claim 1, wherein the tea making room (15) of the tea making mechanism is a hemisphere shape, and
    wherein the top cover (18) is disc-shaped, and mated with the open top of the tea making room (15).

9. The automatic tea maker as claimed in claim 1, wherein the tea outlet pipe (16) of the tea making mechanism has a water inlet (161) located in the center of the tea making room (15).

10. The automatic tea maker as claimed in claim 1, wherein a filter is provided at the water inlet (161) of the tea outlet pipe (16).

11. The automatic tea maker as claimed in claim 1, wherein the rotation driving means is composed of a motor (20), a driving gear (21) and a transmission gear (22),
    wherein the driving gear (21) is provided at an output shaft of the motor (21),
    wherein the transmission gear (22) engages with the driving gear (21), and wherein the tea making room (15) has sides secured to gear faces of the transmission gear (22).

* * * * *